United States Patent [19]
Berryman et al.

[11] 4,059,056
[45] Nov. 22, 1977

[54] RAILWAY SIDE PARCEL INSTALLATION

[75] Inventors: Angus L. Berryman, Dearborn Heights; Gene R. Hooper, Livonia; Richard E. Hague, Franklin, all of Mich.

[73] Assignee: Rax, Incorporated, Waterford, Mich.

[21] Appl. No.: 652,561

[22] Filed: Jan. 26, 1976

[51] Int. Cl.² .......... B60P 3/10; B61D 3/02; B61D 17/08; B62D 25/02
[52] U.S. Cl. .......... 105/368 R; 52/464; 52/469; 105/409; 105/423
[58] Field of Search .......... 52/46 D, 464, 468, 469; 105/368 R, 423, 409

[56] References Cited
U.S. PATENT DOCUMENTS

| | | | |
|---|---|---|---|
| 1,229,710 | 6/1917 | Campbell | 52/464 |
| 2,283,574 | 5/1942 | Pillsbury | 52/464 X |
| 2,838,592 | 6/1958 | Feketics | 52/464 X |
| 3,709,154 | 1/1973 | Peisner et al. | 105/368 R |

*Primary Examiner*—Robert J. Spar
*Assistant Examiner*—Howard Beltran
*Attorney, Agent, or Firm*—Dale Austin Winnie

[57] ABSTRACT

Means for providing protective cover walls on carrier racks used by the railroads to carry automotive vehicles, and including panel wall sections made up of lengths of corrugated sheet metal retained in overlapped and interlocked edge relation by channel sectioned members engaged over the ends thereof, and with clamping means for holding the channel sectioned members on the ends of said panel wall sections and the panel wall sections in turn therewith to the vertical frame members of the carrier racks.

10 Claims, 6 Drawing Figures

U.S. Patent   Nov. 22, 1977   4,059,056
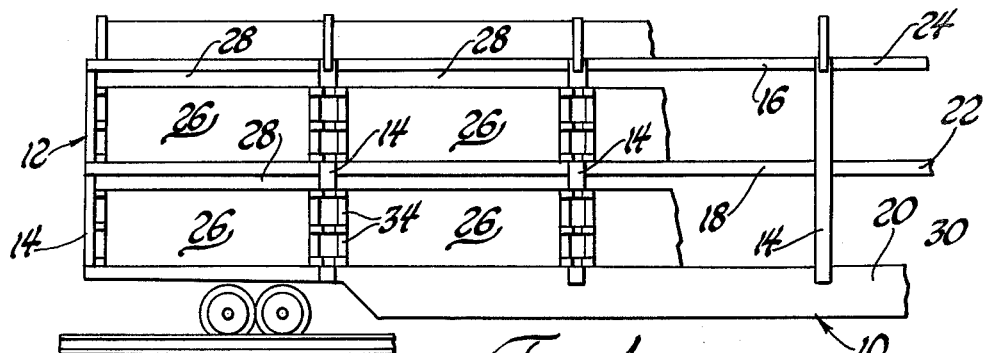
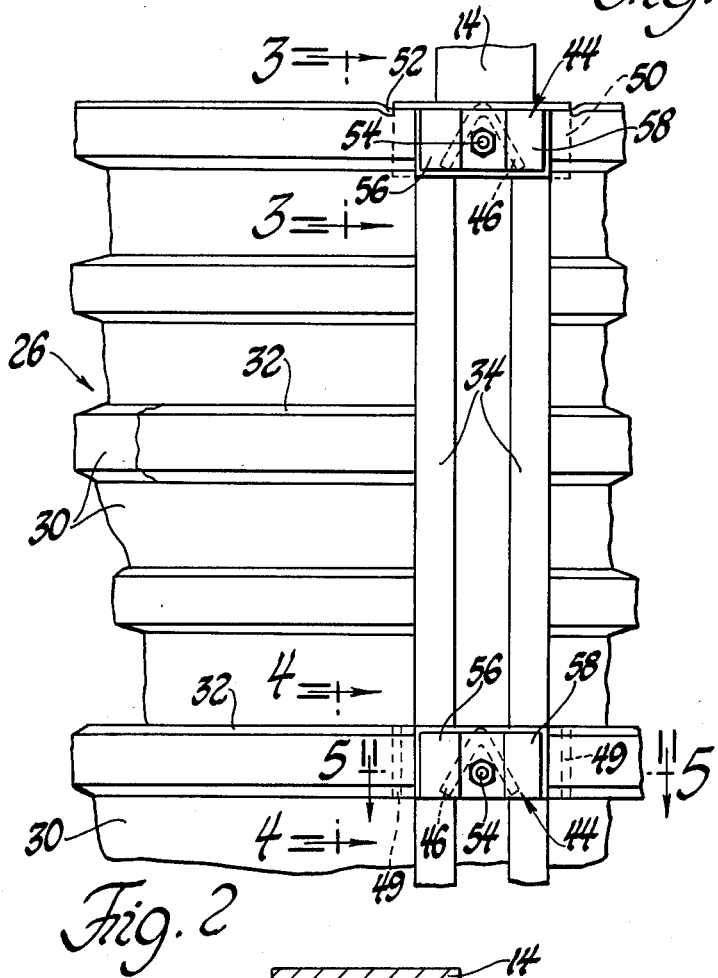
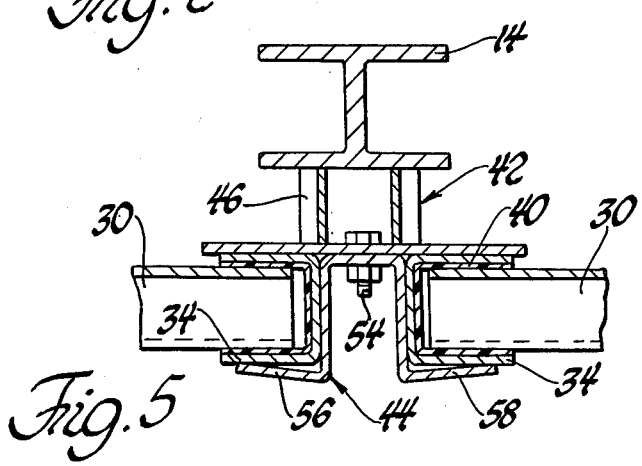
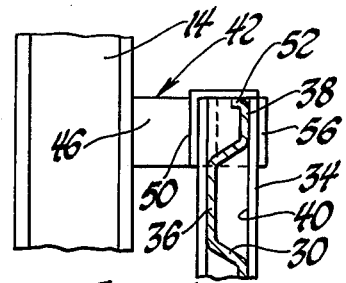
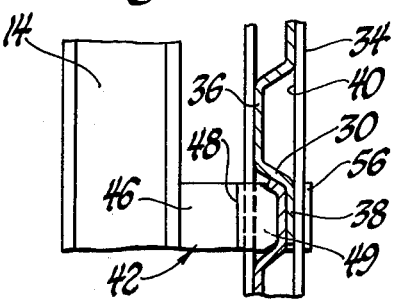
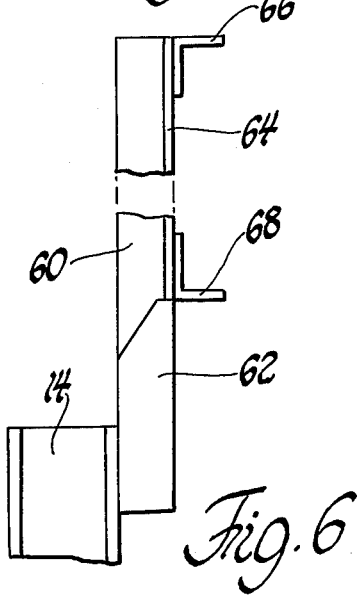

RAILWAY SIDE PARCEL INSTALLATION

BACKGROUND OF THE INVENTION

Railroad flat cars are commonly known as modified and adapted to carry automotive vehicles by using prefabricated racks which enable two or more levels of vehicles to be carried on each flat car.

Normally these racks are made of an open I-beam construction to provide a basic framework with vertical members provided at spaced intervals along opposite sides of the flat car and with cross members therebetween for supporting channel members open upwardly to serve as a driveway and support for the cars, vans, small trucks and other vehicles that are carried.

Until recently, no cover or side wall protection was considered necessary for these carrier racks since all of the vehicles are built to withstand the elements and they can all be securely locked. However, growing incidents of vandalism now make it appear necessary that some form of side wall protection be provided.

Most proposals are for some form of panel or curtain wall protection that will span several of the vertical members and be fastened thereto. However, the protective panels themselves are subject to damage and need to be replaceable, which in turn requires that they be relatively inexpensive, easy to stock and to handle, and that they be readily replaceable, if possible, without requiring that a railroad car be taken out of service while repairs are being made.

Considerations are also due, in providing these protective side walls, as regards how to securely retain them and still allow some flexing over a span of any length, since this is an inherent problem with railroad cars of any appreciable length subject as they are to the irregularities in the lay of railroad tracks.

Still another problem is to prevent the protective panels from rubbing or wearing together, or against other structural members, and causing undue noise and racket.

What is needed is a protective panel wall system which is readily adaptable for use with different open framework carrier racks, makes use of relatively standardized panel lengths, allows for limited lateral flexing, provides means for securing and positively retaining the panels, but allows for their repair or replacement with reasonable ease and expediency.

SUMMARY OF THE PRESENT INVENTION

This invention relates to a structural arrangement for providing protective cover walls on opposite sides of the carrier racks used by railroads to transport automotive and other vehicles.

The system which is proposed makes use of relatively standard lengths of corrugated sheet metal, sufficient to span the distance between next adjacent vertical frame members of the carrier racks, with some overlap at each end, and includes channel members which are fitted over the ends of the sheet metal panel members and are in turn clamped and thereby fastened to the vertical frame members.

The channel members are received in close fitting engagement over the ends of the corrugated sheet metal panels, sufficient to assure reasonable tight rattle-free contact but still allow limited relative movement therebetween. This enables the channel members to be adjusted outwardly and inwardly on the ends of the panel members to compensate for differences in the spacings between the vertical frame members of the carrier racks, if needed, and generally precludes the necessity of cutting and fitting the panel members to size. Further compensation is provided, if needed, in the extent to which the clamping means is allowed to overlap the channel members that are retained thereunder.

The clamping means that are used include upper, lower, and, where needed, intermediate brackets that are welded to the vertical frame members of the carrier racks and serve as backing members to space the channel members apart from the vertical frame members and provide a broader span than the width of the vertical frame members and sufficient to accommodate each of the two channel members which are on the ends of next adjacent panel walls. And, to these are bolted clamping members which serve to hold the channel members engaged thereto.

Panel wall sections are consequently readily removed and replaced by simply unbolting the clamping members to release the channel members on the ends of a given panel wall section and thereby allow the end channels and their panel members to be withdrawn.

IN THE DRAWING FIGURES

FIG. 1 is a side plan view of a railroad car modified and adapted for use as an automotive carrier and having the protective side walls of the present invention used therewith.

FIG. 2 is an enlarged section of the protective wall showing details of construction.

FIG. 3 is an enlarged cross-sectional view taken in the plane of line 3—3 in FIG. 2 and showing the details of the upper bracket and clamping means.

FIG. 4 is an enlarged cross-sectional view taken in the plane of line 4—4 in FIG. 2 and showing the details of a intermediate bracket and clamping means.

FIG. 5 is an enlarged cross-sectional view taken in the plane of line 5—5 in FIG. 2 and showing the details of construction through the intermediate bracket and clamp means.

FIG. 6 is an enlarged and fragmentary view, from one side of an upper post member as adapted for use in providing the protective wall of the present invention.

DETAILED DESCRIPTION OF THE ILLUSTRATED EMBODIMENT

A railroad flat car 10 is shown in the first drawing figure as modified and adapted for use as a vehicle carrier and having a carrier rack 12 of welded I-beam or like construction provided thereon for such purpose.

The carrier rack 12 includes vertical frame members 14 which are disposed at spaced intervals along each side of the railroad flat car 10 and are interconnected by side wall frame members 16 and 18 as well as cross members, which are not shown, to provide lower, intermediate, and upper levels 20, 22 and 24 for receiving and supporting automotive or other vehicles for railway transport, as has been previously mentioned.

Between each of the vertical frame members 14 is provided a protective panel wall section 26 which also extends pretty well between the different levels, except for a viewing space 28. The panel wall is shown as plain faced in the first drawing figure for simplicity but it is actually made up of several like lengths of corrugated sheet metal as best shown in FIG. 2.

Each sheet metal panel member 30, within a given bay, is of the same relative length and is corrugated in a like manner to have the same relative depth or thickness. They are also made with lips or ribs 32 that will interlock with a next adjacent panel member so that they can be stacked and held together edgewise, one over the other, as is shown.

The length of each corrguated sheet metal panel member 30 is slightly more than the prescribed spacing normally provided between next adjacent vertical frame members on the carrier rack, and less than an on-center length would make them. They should be long enough to span the distance between next adjacent vertical frame members with some overlap, but not long enough to meet end-to-end with other panel members.

This dimension is not critical, as will subsequently be appreciated, since an average length can normally be selected that will meet the requirements of most carrier racks and in extreme conditions panels can be cut, if necessary.

On the end of each panel wall section 26 and more particularly over the ends of each of the sheet metal panel members 30 which make up a wall section, is provided an channel member 34. Each channel member is of sufficient length to receive a given member of panel members 30 in interlocked edgewise relation therewith and has the channel opening thereof sized to receive them in close fitted engagement therewith.

As shown in FIGS. 3 and 4, opposite wall faces 36 and 38 of the corrugated panel members are held in close engagement with the inner surfaces of the channel member legs but they are not otherwise fixed thereto. The channel members are simply fitted over the rough ends of the panel members and frictionally held in engagement therewith.

This allows for a degree of adjustment inwardly and outwardly on the panel edges for some variation in the panel wall width, where required, and it also allows the panel members some freedom of movement and provides a safeguard against racking which would otherwise occur if the panels were fixed at opposite ends.

This is a serious problem with other protective wall systems having panel members that span greater distances and where their opposite ends are fixed or securely fastened down.

To avoid a metal-on-metal contact between the panel ends and the channel legs, which can cause wear, rust and noise, the inner surface of each channel member 34 has a vinyl coating 40, as best shown in FIG. 5 and also apparent in FIGS. 3 and 4. This does not interfer in any way with the close fitting engagement but is simply a sound deadening and otherwise protective coating for longer life and better appearance over the servicable life of the system.

The panel wall sections 26, that is the panel members 30 and their respective channel members 34, are fastened to the vertical frame members 14 of the carrier rack by means of brackets 42 which are welded to the frame members and hat-sectioned clamps 44 which are bolted to the brackets and overlap and hold next adjacent channel members of different panel wall sections thereto.

The brackets 42 include short pieces of angle iron 46 butt welded to the face of the vertical frame members, and open downwardly, with a flat piece 48 or angle iron piece 50 welded in turn thereto. Those with the angle iron piece 50 are used as the upper and lower brackets, having the right angle flange or leg of the former at the tip and at the bottom as regards the latter, while the other one serves as the intermediate bracket for the mid-section clamp that is used. The intermediate bracket may also include tabs or ears 49 at each end which extend within the form of the panel wall sections and provide bearing support therefor.

As shown most clearly in FIGS. 2 and 3, the combined width of the panel members is just slightly more than the length of the channel members that fit over their ends, so that they have a lip 52 that extends therebeyond and will be slightly crimped over as forced under the overhanging leg of the upper bracket member. This also is the situation at the lower panel edge, although not shown, and as a consequence a close and tight fit of the panels in the channel members is assured, the compressive force providing lateral spread within the corrugations, and the panels are captured and held against vertical movement at each end.

The clamping members 44 are hat-sectioned so that they will extend inbetween next adjacent channel sectioned members 34, as disposed on the ends of next adjacent panel wall sections, and provide a shoulder stop surface to keep the channel sectioned members engaged on the ends of the panel wall sections. They are also of sufficient depth so that they will not turn but stay oriented for their intended dual clamping use and will require only a single fastening means, shown as the threaded bolt and nut fastener 54.

Although not specifically shown, it will be appreciated that the dual purpose clamping members 44 are not required on the vertical frame members at the ends of the carrier rack and that these would be more Z shaped, since clamping is required at only one side thereof.

The two outwardly extending legs 56 and 58 of the clamping members 44, are shown in FIG. 5 to be turned slightly inward so that they engage the channel sectioned members 34 nearer their open side, on the panel wall sections, to better hold the channel member thereto and also to providing a binding force between the legs of the channel members and the panel member ends received therewithin.

FIG. 6 shows an extension 60 which may be welded to the top ends of the vertical frame members 14, to provide a support for protective paneling for the upper level on a carrier rack, since the frame members do not normally extend to the height. They are simply made of angle iron with a channel forming flange 62 added near the bottom for better welding support and to assure proper orientation of the face wall 64 on which are welded upper and lower angle iron bracket members 66 and 68 and through which are provided the bolt holes, although not shown, for fastener means and clamps that are used to retain the channel members and their panel walls thereto as in the arrangement which has been previously described.

From the foregoing it will be appreciated that relatively standarized lengths of corrugated sheet metal, of modest width, may be used to provide the protective wall covering desired, for use on automotive carrier racks on railroad flat cars, by having the sheet metal panels of a length to span the distance between next adjacent vertical frame members of the carrier rack, stacked and interlocked edgewise, and with their opposite ends capped by a channel sectioned member which fits tightly thereover.

The protective wall sections, thus formed, are in turn mounted on the carrier racks by means of brackets and clamping members which hold them securely to the vertical frame members of the carrier racks, with the clamping means between next adjacent panel wall sections capable of holding both wall sections and requiring only singular fastening means.

The bracket and clamping means used are simple and inexpensive in construction and yet cleverly devised to receive and hold the panel wall sections frictionally engaged against the vertical frame members of the carrier rack, while the clamping means are being applied or removed, and to thereafter cause the clamping means to hold the channel member ends on the panel wall sections, while still allowing limited relative movement therebetween, due to the rolling and rocking of the railroad car on which the carrier rack is mounted, and prevent any dislocation of the protective wall covering provided by the proposed system.

The particular novelty claimed for this system is as set forth in the hereinafter appended claims:

I claim:

1. Means for providing protective cover walls on the sides of carrier racks used by the railroads to transport automotive and other vehicles, and comprising; panel wall sections of sufficient width for spanning the distance between next adjacent vertical frame members of the carrier racks, channel sectioned members having the ends of said panel wall sections received in relatively adjustable frictional engagement there within, and means for clamping and relatively securely fastening said channel sectioned members to the vertical frame members and for thereby in turn relatively retaining said panel wall sections relatively self and otherwise adjustably engaged thereto in general use.

2. The means for providing the protective cover walls as set forth in claim 1, said panel wall sections including relatively standardized lengths of corrugated sheet metal disposed in edge locking relation relatively one over the other and with their ends received and enclosed within said channel sectioned members.

3. The means for providing protective cover walls as set forth in claim 2, said channel sectioned members having close fitting engagement over the ends of said corrugated sheet metal and having a protective coating for wear and rust resistance provided therebetween.

4. The means for providing the protective cover walls as set forth in claim 3, said clamping means as disposed between next adjacent panel wall sections including hat-sectioned clamping members having overlapping engagement with the channel sectioned members on the ends of each next adjacent pannel wall section and shoulder stop engagement therebetween, said clamping members having the overlapping ends thereof formed inwardly and for contacting engagement with said channel sectioned members near the outer edges thereof to better hold said channel members thereunder and impose a binding force between the edges of said channel members and the ends of said panel wall sections received therewithin, said clamping members having sufficient width as disposed between next adjacent channel sectioned members for precluding undesirable relative rotation thereof and requiring only singular fastening means therefor, and including bracket members provided on the vertical frame members of said carrier racks and having said clamping means engaged thereto, and said bracket members, as disposed to receive the clamping means for the upper and lower ends of said panel wall sections, including outwardly disposed flanges receptive of said channel sectioned members therebetween and for closing the ends thereof and capturing the ends of said panel wall sections therewithin, said panel wall sections having a slightly greater width than the length of said channel sectioned members received over the ends thereof, and said upper and lower disposed bracket members being spaced to position the flanges thereof for receiving said channel sectioned members therebetween and requiring frictional engagement of the upper and lower corner ends of said panel wall sections therewithin for retaining the panel wall and channel sectioned member assemblage thereto while said clamping means are being engaged therewith.

5. The means for providing protective cover walls as set forth in claim 1, said clamping means as disposed between next adjacent panel wall sections including hat-sectioned clamping members having overlapping engagement with the channel sectioned members on the ends of each next adjacent panel wall section and shoulder stop engagement therebetween.

6. The means for providing protective cover walls as set forth in claim 5, said clamping members having overlapping ends thereof formed inwardly and for contacting engagement with said channel sectioned members near the outer edges thereof to better hold said channel members thereunder and impose a binding force between the edges of said channel members and the ends of said panel wall sections received therewithin.

7. The means for providing protective cover walls as set forth in claim 5, said clamping members having sufficient width as disposed between next adjacent channel sectioned members for precluding undesirable relative rotation thereof and requiring only singular fastening means therefor.

8. The means for providing protective cover walls as set forth in claim 1, and including bracket members provided on the vertical frame members of said carrier racks and having said clamping means engaged thereto, and said bracket members, as disposed to receive the clamping means for the upper and lower ends of said panel wall sections, including outwardly disposed flanges receptive of said channel sectioned members therebetween and for closing the ends thereof and capturing the ends of said panel wall sections therewithin.

9. The means for providing protective cover walls as set forth in claim 8, said panel wall sections having a slightly greater width than the length of said channel sectioned members received over the ends thereof, and said upper and lower disposed bracket members being spaced to position the flanges thereof for receiving said channel sectioned members therebetween and require frictional engagement of the upper and lower corner ends of said panel wall sections therewith for retaining the panel wall and channel sectioned member assemblage thereto while said clamping means are being engaged therewith.

10. The means for providing protective cover walls as set forth in claim 1, and including mounting brackets provided at vertically spaced intervals on each of said vertical frame members for receiving and having said clamping members engaged thereto and for singular use of said clamping means therewith in retaining relatively next adjacent panel wall sections engaged thereto and relatively spaced outwardly of said vertical frame members.

* * * * *